(12) United States Patent
Jiang (10) Patent No.: US 7,852,844 B2
(45) Date of Patent: Dec. 14, 2010

(54) METHOD AND RELATED APPARATUS FOR RECONFIGURING SIZE OF A RECEIVING WINDOW IN A COMMUNICATIONS SYSTEM

(75) Inventor: Sam Shiaw-Shiang Jiang, Taipei (TW)

(73) Assignee: Innovative Sonic Limited, Taipei (TW)

( * ) Notice: Subject to any disclaimer, the term of this patent is extended or adjusted under 35 U.S.C. 154(b) by 1071 days.

(21) Appl. No.: 11/278,545

(22) Filed: Apr. 4, 2006

(65) Prior Publication Data

US 2006/0221833 A1    Oct. 5, 2006

Related U.S. Application Data

(60) Provisional application No. 60/594,414, filed on Apr. 5, 2005.

(51) Int. Cl.
| | |
|---|---|
| H04L 12/28 | (2006.01) |
| H04L 12/56 | (2006.01) |
| H04J 1/14 | (2006.01) |
| G08C 25/02 | (2006.01) |
| H04L 1/18 | (2006.01) |

(52) U.S. Cl. .................. 370/394; 370/473; 714/748; 714/749

(58) Field of Classification Search ................. 370/394, 370/493; 714/748, 749
See application file for complete search history.

(56) References Cited

U.S. PATENT DOCUMENTS

| | | | |
|---|---|---|---|
| 2003/0169741 A1* | 9/2003 | Torsner et al. | 370/394 |
| 2003/0210669 A1* | 11/2003 | Vayanos et al. | 370/335 |
| 2005/0047363 A1 | 3/2005 | Jiang | |
| 2005/0047525 A1* | 3/2005 | Lee | 375/316 |
| 2005/0100048 A1* | 5/2005 | Chun et al. | 370/468 |

FOREIGN PATENT DOCUMENTS

| | | |
|---|---|---|
| JP | 2002-271435 | 9/2002 |
| JP | 2005-73250 | 3/2005 |
| TW | 200509627 | 3/2005 |
| WO | 2004091130 A1 | 10/2004 |

OTHER PUBLICATIONS

3rd Generation Partnership Project; Technical Specification Group Radio Access Network; Medium Access Control (MAC) protocol specification (Release 6), Dec. 2004.*
3GPP TS 25.321 V5.10.0 (Dec. 2004), "Medium Access Control (MAC) protocol specification".
3rd Generation Partnership Project; Technical Specification Group Radio Access Network; Medium Access Control(MAC) protocol specification (Release 6), 3GPP TS 25.321 V6.4.0 (Mar. 2005), pp. 1-74, XP002585168.

* cited by examiner

Primary Examiner—Ayaz R Sheikh
Assistant Examiner—Tarell Hampton (57) ABSTRACT

A method for reconfiguring size of a receiving window in a communications system avoiding duplicate packet delivery to an upper layer to keep ciphering parameters in synchronization when the communications system reconfigures a receiving window of a receiver includes receiving a command for reconfiguring a size of the receiving window, reconfiguring the size of the receiving window according to the command, removing packets with sequence numbers outside the receiving window from buffers of the receiver and delivering the packets to the upper layer, determining whether a sequence number of a next expected packet is below the receiving window, and keeping the sequence number of the next expected packet and the packets in a reordering buffer of the receiver unchanged when the sequence number of the next expected packet is not below the receiving window.

4 Claims, 4 Drawing Sheets

METHOD AND RELATED APPARATUS FOR RECONFIGURING SIZE OF A RECEIVING WINDOW IN A COMMUNICATIONS SYSTEM

CROSS REFERENCE TO RELATED APPLICATIONS

This application claims the benefit of U.S. Provisional Application No. 60/594,414, filed Apr. 5, 2005, and included herein by reference.

BACKGROUND OF THE INVENTION

1. Field of the Invention

The present invention is a method of reconfiguring a receiving window size in a communications system, in particular reconfiguring the receiving window size of a receiver of the communications system while avoiding delivering packets that had been previously sent to an upper layer and therefore maintain synchronization in ciphering parameters.

2. Description of the Prior Art

In a wireless communications system, in order to maintain correctly synchronized data packet exchanges between a receiver and a transmitter, a sequence number is normally added to a header of a packet to be transmitted. The receiver is able to compare the sequence number with a sequence number of a next expected packet and determine if the packet received is a correct packet. In general, consecutive packets have consecutive sequence numbers. With different applications, receivers use different methods of adding sequence numbers. For example, a receiver can accumulate sequence numbers of packets to be transmitted, meaning that a sequence number of a packet is a sequence number of a previously received packet plus one. However, as the number of transmitted packets gets large, accumulative sequence numbers of packets to be transmitted become huge and hence affect transmission efficiency. Therefore, when the number of transmitted packets is large, the prior art uses a cyclic method of accumulating sequence numbers. For example, if sequence numbers are represented with 7 bits, then a sequence number starts with 0 and accumulates up to 127. When the sequence number exceeds 127 the sequence number wraps back to 0. Sequence numbers 127 and 0 are considered as consecutive sequence numbers. In some protocol layers, there is an additional hyper frame number (HFN) accumulated each time the 127 wraps back to 0. Therefore, the transmitter and the receiver accumulate the HFN accordingly to keep each other in synchronization, so that following processes, such as ciphering, can be properly executed.

In addition, the transmitter and the receiver comprise a transmitting window and a receiving window respectively for more efficient packet transmission and less packet loss due to noise interference. Taking the receiving window as an example, if a packet received by the receiver is inside the receiving window, then reordering, discarding duplicate packets, or advancing the receiving window can be carried out. If the packet received from the receiver is outside the receiving window, then either the packet is discarded or the receiving window is advanced. Thus, out of order delivery to upper layer can be avoided when packets are received out of order due to noises or other interferences. The receiving window is defined differently for different applications. For instance, for high-speed transmission, in a High Speed Downlink Packet Access (HSDPA), a span of the receiving window is defined by a highest (last) transmission sequence number of received protocol data units. However, if the communications system reconfigures the receiving window size, a transmission error may occur. Please see the following description.

The HSDPA is a technology used in Wideband Code Division Multiple Access (WCDMA) systems to achieve high data rate on the downlink transmission. According to technical specifications, a High Speed Medium Access Control (MAC-hs) entity of the HSDPA comprises four sublayers or entities from bottom to top in order:

1. Hybrid Automatic Repeat Request (HARQ) Entity: generating an acknowledged reporting signal or a negatively acknowledged reporting signal according to a received Protocol Data Unit (PDU) and handling all the tasks that are required for a hybrid ARQ protocol.

2. Re-order Queue Distribution Entity: distributing PDUs to corresponding re-order queues according to queue IDs of PDUs to support transmission data required by different services.

3. Reordering Entity: each reordering entity comprises a re-order queue, the reordering entity reorders PDUs received according to transmission sequence numbers (TSNs). According to the specification of the MAC-hs of the HSDPA, if a previous PDU of a current PDU was not received correctly, the current PDU will not be delivered to its upper layer, i.e., the Disassembly Entity.

4. Disassembly Entity: removing a header and all padding bits of a PDU, and delivering a payload after disassembly to an upper layer (Dedicated Medium Access Control, MAC-d).

According to the specification of the HSDPA, each PDU comprises a 6-bit TSN block to represent TSNs from 0 to 63. When the TSN exceeds 63, the TSN starts with 0 again. The specification of the HSDPA defines the following parameters and variables to specify a size and a span of a receiving window:

1. Parameter RECEIVE_WINDOW_SIZE: represents a size of a receiving window and is defined by the system.

2. Variable next_expected_TSN: represents a TSN of a PDU following a TSN of a last in-sequence PDU received. The next_expected_TSN is updated upon a delivery to the Disassembly Entity layer of a PDU with a TSN equal to the next_expected_TSN. An initial value of the next_expected_TSN is 0.

3. Variable RcvWindow_UpperEdge: represents an upper edge of a receiving window. After a first PDU has been received successfully, RcvWindow_UpperEdge equals a PDU with a highest TSN of all received PDUs.

When performing arithmetic comparisons of the TSNs described above, a 64 modulus operation is used taking (RcvWindow_UpperEdge−RECEIVE_WINDOW_SIZE+1), which is also a lower edge of the receiving window, as the modulus base. For example, consider the two consecutive TSNs 63 and 0. Suppose the receiving window lower edge=(RcvWindow_UpperEdge−RECEIVE_WINDOW_SIZE+1)=50. Since (63−50) mod 64=13 and (0−50) mod 64=14, it is known that, for consecutive TSNs, TSN=0 is greater (later) than TSN=63.

As described above, only PDUs with TSNs inside the receiving window are temporarily stored in a reordering buffer where reordering occurs. Therefore, the receiving window size defines a size of a memory required by the reordering buffer and the size of the receiving window is equal to the parameter RECEIVE_WINDOW_SIZE with the receivable TSNs span being from (RcvWindow_UpperEdge−RECEIVE_WINDOW_SIZE+1) to RcvWindow_UpperEdge.

In prior art, saving the memory size required by the reordering buffer can be achieved by reducing the receiving window size by the system through resetting the parameter RECEIVE_WINDOW_SIZE to be a smaller value. This can be done on line when a re-ordering queue unit is in operation. According to the specification of the MAC-hs of the HSDPA in prior art, when the receiver receives a command for reconfiguring the receiving window size corresponding to a reordering queue, the receiver resets the parameter RECEIVE_WINDOW_SIZE according to the command and removes PDUs with TSNs before the receiving window from the reordering buffer and delivers the PDUs to an upper layer (Disassembly Entity). At this moment, it is determined if the next_expected_TSN is less than or equal to a difference between the parameter RcvWindow_UpperEdge and a new parameter RECEIVE_WINDOW_SIZE, meaning determining if (next_expected_TSN≦RcvWindow_UpperEdge−RECEIVE_WINDOW_SIZE) is true. If true, first set the parameter next_expected_TSN to be a lower edge of a new receiving window then, deliver received PDUs with consecutive TSNs from the variable next_expected_TSN up to a TSN corresponding to a first not received PDU of the receiver to the upper layer from the buffer of the receiver. Finally, set the variable next_expected_TSN to be the TSN corresponding to the first not received packet.

For example, suppose that a receiver window size is 16 (RECEIVE_WINDOW_SIZE=16) and PDUs with TSN=0 to TSN=25 (inclusive) except 17 are successfully received. In addition, suppose that a PDU with TSN=30 is also received successfully (PDUs with TSN=26 to TSN=29 are not yet received), and PDUs with TSN=0 to TSN=16 are delivered to an upper layer. By prior art, we have: RcvWindow_UpperEdge=30, next_expected_TSN=17 and the receiver window spans from TSN=15 (=30−16+1) to TSN=30. Now, suppose that the network system reconfigures the receiving window size to 8 (RECEIVE_WINDOW_SIZE =8). By prior art, it is known that the receiving window span becomes TSN=23 (=30−8+1) to TSN=30. And delivering PDUs received before a new receiving window to the upper layer means the PDUs with TSN=18 to TSN=22 are delivered to the upper layer. Now, since the variable next_expected_TSN is smaller (with the lower edge of the receiving window, which is 23 at this moment, as a modulus base in a modulus operation) than the difference between the variable RcvWindow_UpperEdge and the new variable RECEIVE_WINDOW_SIZE ((17−23) mod 64<(30−8−23) mod 64), so that the variable next_expected_TSN is set to a new lower edge of the receiving window (next_expected_TSN =23) and, then, PDUs corresponding to TSN=23 to TSN=25 are delivered to the upper layer. Finally set the variable next_expected_TSN to be a TSN of a first not received PDU, which means next_expected_TSN =26.

With the above procedures as the prior art, the HSDPA system is able to reduce the receiving window size and hence effectively use the memory of the reordering buffer. However, in some cases, a method of reconfiguring the receiving window size of the prior art may cause serious problems and transmission errors.

For example, suppose that a receiver window size is 16 (RECEIVE_WINDOW_SIZE =16) and PDUs with TSN=0 to TSN=30 (inclusive) are successfully received and delivered to the upper layer. By the prior art, we have RcvWindow_UpperEdge=30, next_expected_TSN=31 and the receiver window spans from TSN=15 (=30−16+1) to TSN=30. Suppose that the network system reconfigures the receiving window size to 8(RECEIVE_WINDOW_SIZE =8) now. By the prior art, it is known that the receiving window span becomes TSN=23 (=30−8+1) to TSN=30. By a modulus operation with the lower edge of the receiving window to be a modulus base, it is able to determine whether (next_expected_TSN≦RcvWindow_UpperEdge−RECEIVE_WINDOW_SIZE) is true. This is determined by calculating (next_expected_TSN−23) mod 64=(31−23) mod 64=8 and (RcvWindow_UpperEdge−RECEIVE_WINDOW_SIZE −23) mod 64=(30−8−23) mod 64=63. Since 8<63, (next_expected_TSN≦RcvWindow_UpperEdge−RECEIVE_WINDOW_SIZE) is true. Therefore, the variable next_expected_TSN is set to be the lower edge of the receiving window (next_expected_TSN=23), and PDUs with TSN=23 to TSN=30 are delivered to the upper layer again. Finally the variable next_expected_TSN is set to be a TSN of a first not received PDU, which means next_expected_TSN=31. In other words, the variable next_expected_TSN is set to be 23 from a initial 31 then back to 31 and the PDUs with TSN=23 to TSN=30 are delivered to the upper layer for a second time. In some modes that support duplicate sequence number detection, delivering the PDUs with TSN=23 to TSN=30 again is only wasting system resources and reducing efficiency. For specific operational modes, such as Unacknowledged Mode (UM) which does not support duplicate sequence number detection, TSNs of PDUs delivered again are recognized as sequence number of a next cycle (i.e. HFN is accumulated by 1) causing the transmitter and the receiver ciphering/deciphering parameters to fall out of synchronization and serious errors may occur in deciphered data. Eventually, the system is required to reset the transmitter and the receiver to regain synchronization of the ciphering/deciphering parameters.

In summary, in prior art, when (next_expected_TSN=RcvWindow_UpperEdge+1) is true, i.e., the next expected TSN is equal to the first TSN after the receiving window upper edge, if the system reconfigures the receiving window size, part of PDUs that had been delivered to the upper layer will be delivered again. This not only wastes system resources and reduces efficiency, but also erroneously accumulates the HFN causing the transmitter's and the receiver3 s ciphering/deciphering parameters to be out of synchronization. Finally, the system is required to reset the transmitter and the receiver to recover this error. System performance is deteriorated.

SUMMARY OF THE INVENTION

A method for reconfiguring a size of a receiving window of a receiver in a communications system comprises receiving a command for reconfiguring the size of the receiving window, reconfiguring the size of the receiving window according to the command, removing packets with sequence numbers outside the receiving window with reconfigured size from a buffer of the receiver and delivering the packets to an upper layer, determining whether a sequence number of a next expected packet is below the receiving window with reconfigured size, and keeping the sequence number of the next expected packet and the packets in the buffer of the receiver unchanged when the sequence number of the next expected packet is not below the receiving window with reconfigured size.

These and other objectives of the present invention will no doubt become obvious to those of ordinary skill in the art after reading the following detailed description of the preferred embodiment that is illustrated in the various figures and drawings.

DETAILED DESCRIPTION

The present invention applies to a receiving window of a receiver whose span and size are defined by an upper edge of the receiving window in a communications system. The following description takes the MAC-hs of the HSDPA as an example.

Figure 3:
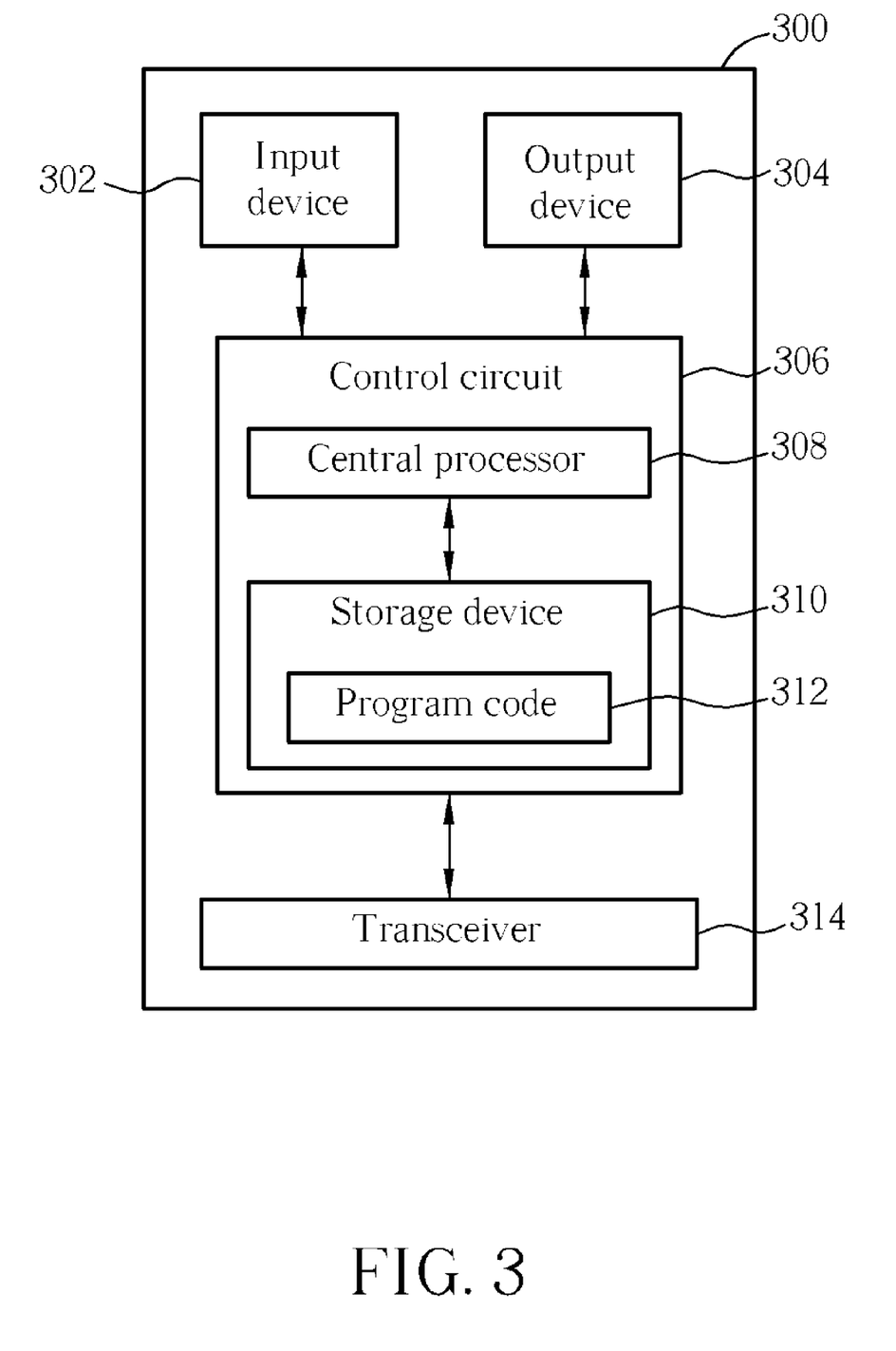
FIG. 3 is a block diagram of a mobile communication device.

First of all, please refer to FIG. 3. FIG. 3 is a block diagram of a mobile communications device 300. For clarity, FIG. 3 only shows an input device 302, an output device 304, a control circuit 306, a central processor 308, a storage device 310, a program code 312, and a transceiver 314 of the mobile communications device 300. In the mobile communications device 300, the control circuit 306 executes the program code 312 stored in the storage device 310 with the central processor 308, and then controls operations of the mobile communications device 300. The mobile communications device 300 can receive signals inputted by users through the input device 302, or output signals like images, sounds etc. through the output device 304 (such as monitor, speaker etc.). The transceiver 314 is used for receiving and transmitting radio signals. In a structure of a communications protocol, the transceiver 314 is known as a part of a first layer, whereas the control circuit 306 is an application of a second and a third layer.

Figure 4:
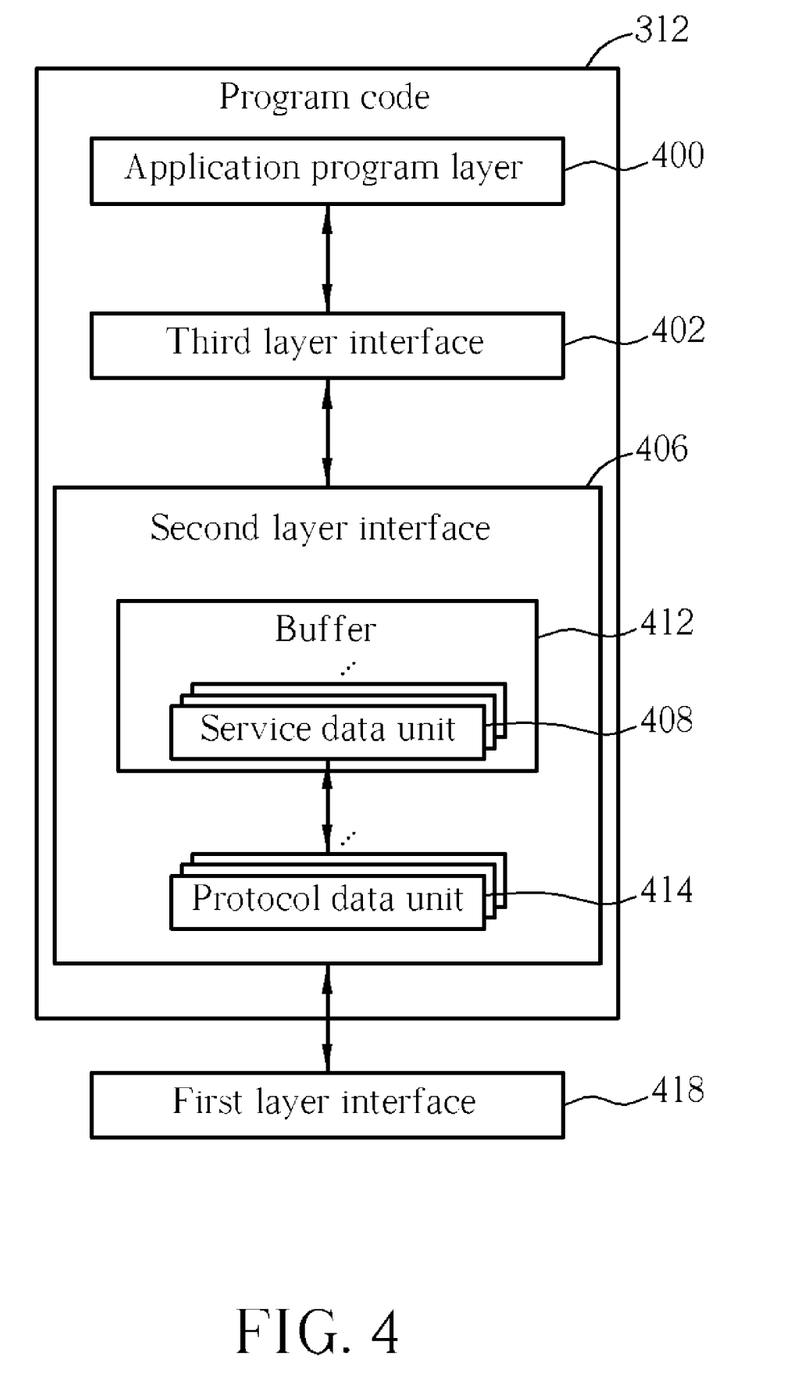
FIG. 4 is a diagram of the program code in FIG. 3.

Please refer to FIG. 4. FIG. 4 is a schematic diagram of the program code 312 in FIG. 3. The program code 312 comprises an application program layer 400, a third layer interface 402, a second layer interface 406, and a first layer interface 418. When transmitting signals, the third layer interface 402 submits Service Data Units (SDUs) 408 to the second layer interface 406 and the second layer interface 406 stores the SDUs 408 in a buffer 412. Then, the second layer interface 406 generates a plurality of PDUs 414 according to the SDUs 408 stored in the buffer 412 and outputs the PDUs 414 generated to a destination through the first layer interface 418. Conversely, when receiving a radio signal, the radio signal is received through the first layer interface 418 and the first layer interface 418 outputs PDUs 414 to the second layer interface 406. The second layer interface 406 restores the PDUs 414 to SDUs 408 and stores the SDUs 408 in the buffer 412. At last, the second layer interface 406 transmits the SDUs 408 stored in the buffer 412 to the third layer interface 402. As the radio signal is received, whether the program code 312 stores the SDUs 408 in the buffer 412 is determined by the span of the receiving window. If the PDUs received are inside the receiving window span, then reordering, discarding duplicate packets, and/or advancing receiving window are carried out; if not, advancing receiving window is carried out.

In some situations, the program code 312 needs to reconfigure (reduce) the receiving window size to more efficiently use the buffer. In this case, the present invention provides a method of reconfiguring the receiving window size of the receiver.

Figure 1:
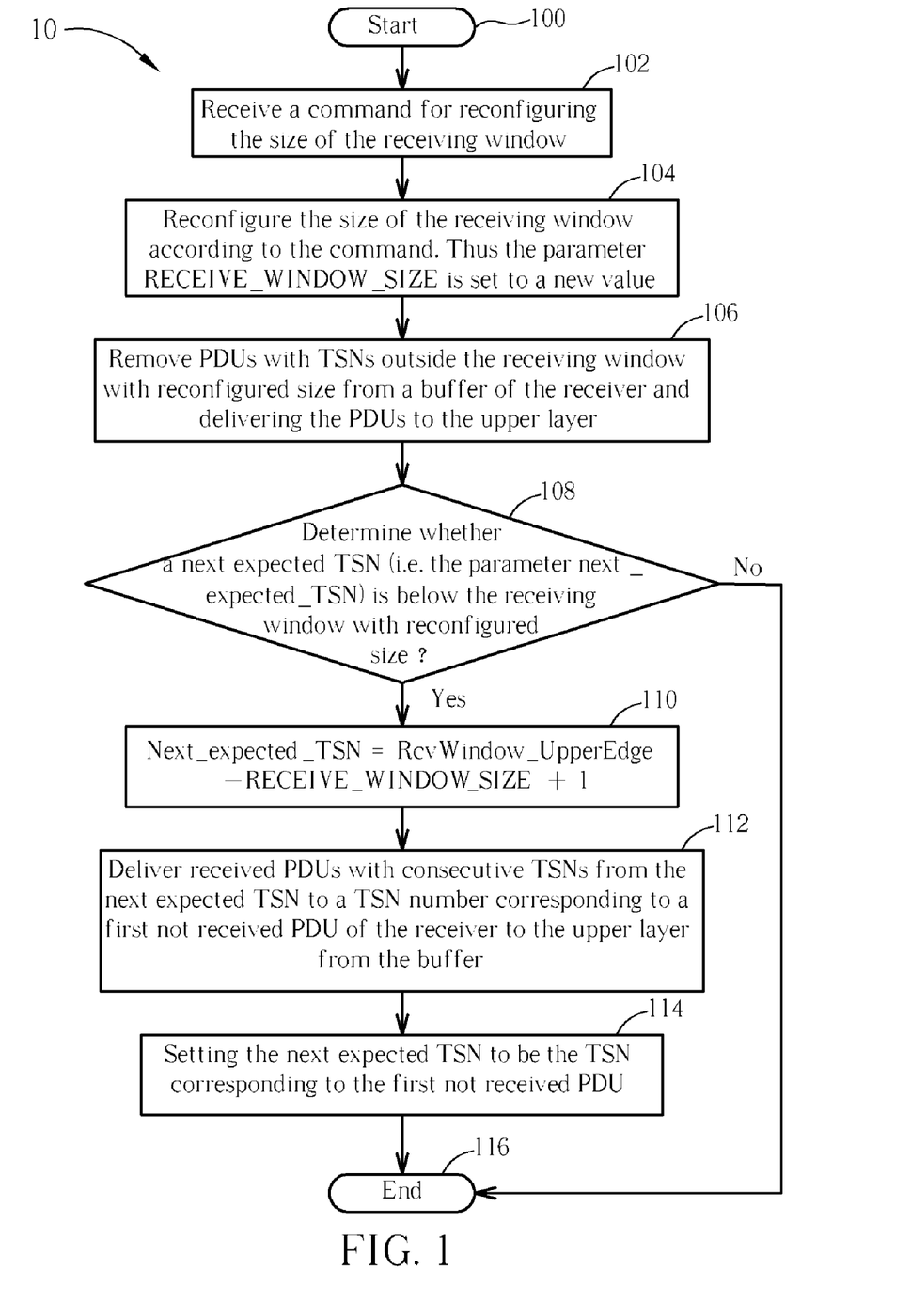
FIG. 1 is a flow chart of a first embodiment of the present invention.

Please refer to FIG. 1. FIG. 1 is a flow chart of a procedure 10 of a first embodiment in the present invention. The procedure 10 is reconfiguring the receiving window size of the receiver in a HSDPA system, where the parameter RECEIVE_WINDOW_SIZE, the parameter next_expected_TSN, and the parameter RcvWindow_UpperEdge are defined as described above. The procedure 10 comprises:

Step 100: start.

Step 102: receive a command for reconfiguring the size of the receiving window.

Step 104: reconfigure the size of the receiving window according to the command.

Thus the parameter RECEIVE_WINDOW_SIZE is set to a new value.

Step 106: remove PDUs with TSNs outside the receiving window with reconfigured size from a buffer of the receiver and delivering the PDUs to the upper layer.

Step 108: determine whether a next expected TSN (i.e. the parameter next_expected_TSN) is below the receiving window with reconfigured size. If so, go to step 110; otherwise, go to step 116.

Step 110: set the TSN of the next expected packet to be a lower edge of the receiving window with reconfigured size. This means that executing the (next_expected_TSN=RcvWindow_UpperEdge−RECEIVE_WINDOW_SIZE+1) operation.

Step 112: deliver received PDUs with consecutive TSNs from the next expected TSN to a TSN number corresponding to a first not received PDU of the receiver to the upper layer from the buffer.

Step 114: setting the next expected TSN to be the TSN corresponding to the first not received PDU.

Step 116: end.

According to the procedure 10, after the present invention receives the command for reconfiguring the receiving window size, the parameter RECEIVE_WINDOW_SIZE is set to a value requested by the command so that the receiving window size is reconfigured to a size requested by the system. At the same time, deliver PDUs with TSNs outside the receiving window with reconfigured size and remove the PDUs from the buffer. The present invention then determines whether the parameter next_expected_TSN is below the receiving window with reconfigured size. If not, for instance, the next expected TSN equals a first TSN after the upper edge of the receiving window, i.e., if next_expected_TSN= RcvWindow_UpperEdge+1, the present invention leaves the parameter next_expected_TSN unchanged, and does not process PDUs in the buffer. In contrast, if the parameter next_expected_TSN is below the receiving window with reconfigured size, then the parameter next_expected_TSN is set to be a lower edge of the new receiving window; then received PDUs with consecutive TSNs from the next expected TSN to a TSN number corresponding to a first not received PDU of the receiver are delivered to the upper layer from the buffer. Finally, the next expected TSN is set to be the TSN corresponding to the first not received PDU.

In accordance to the parameters and variables defined in the specification of the HSDPA, it is known that the parameter next_expected_TSN can be outside the span of the receiving window, but not equal to the parameter RcvWindow_UpperEdge (since the parameter RcvWindow_UpperEdge equals a TSN of a PDU while the TSN equals a largest TSN among TSNs of all received PDUs). So that the parameter next_expected_TSN spans from (RcvWindow_UpperEdge−RECEIVE_WINDOW_SIZE+1) to (RcvWindow_UpperEdge−1) or equals to (RcvWindow_UpperEdge+1).

From the procedure 10, the present invention is able to avoid erroneously retransmitting PDUs that had been transmitted before when the system reconfigures the receiving window size. As an comparison, when (next_expected_TSN=RcvWindow_UpperEdge+1) is true, if the system reconfigures the receiving window size, the prior arts not only causes waste in system resources and efficiency, but also mistakenly accumulates the HFN which leads to de-synchronization of the transmitter's and the receiver's ciphering/deciphering parameters. Lack of synchronization causes the system to reset the transmitter and the receiver. Therefore, the present invention is able to effectively solve problems of the prior art.

For example, suppose that a receiver window size is 16 (RECEIVE_WINDOW_SIZE=16) and PDUs with TSN=0 to TSN=30 (inclusive) are successfully received and delivered to the upper layer. The RcvWindow_UpperEdge=30, next_expected_TSN=31 and the receiver window spans from TSN=15 (=30−16+1) to TSN=30 when the system reconfigures the receiving window size to 8 (RECEIVE_WINDOW_SIZE=8). According to the procedure 10 of the present invention, since next_expected_TSN=31 is not below the receiving window, the parameter next_expected_TSN remains unchanged and PDUs in the buffer are not processed, so that PDUs with TSN=23 to TSN=30 will not be delivered again. In addition, the parameter next_expected_TSN remains unchanged (=31). With this method, problem such as re-delivering PDUs to the upper layer that occurs in the prior art is solved. If the next expected TSN is below the receiving window, then processes are the same as the prior art and will not be explained again here.

Figure 2:
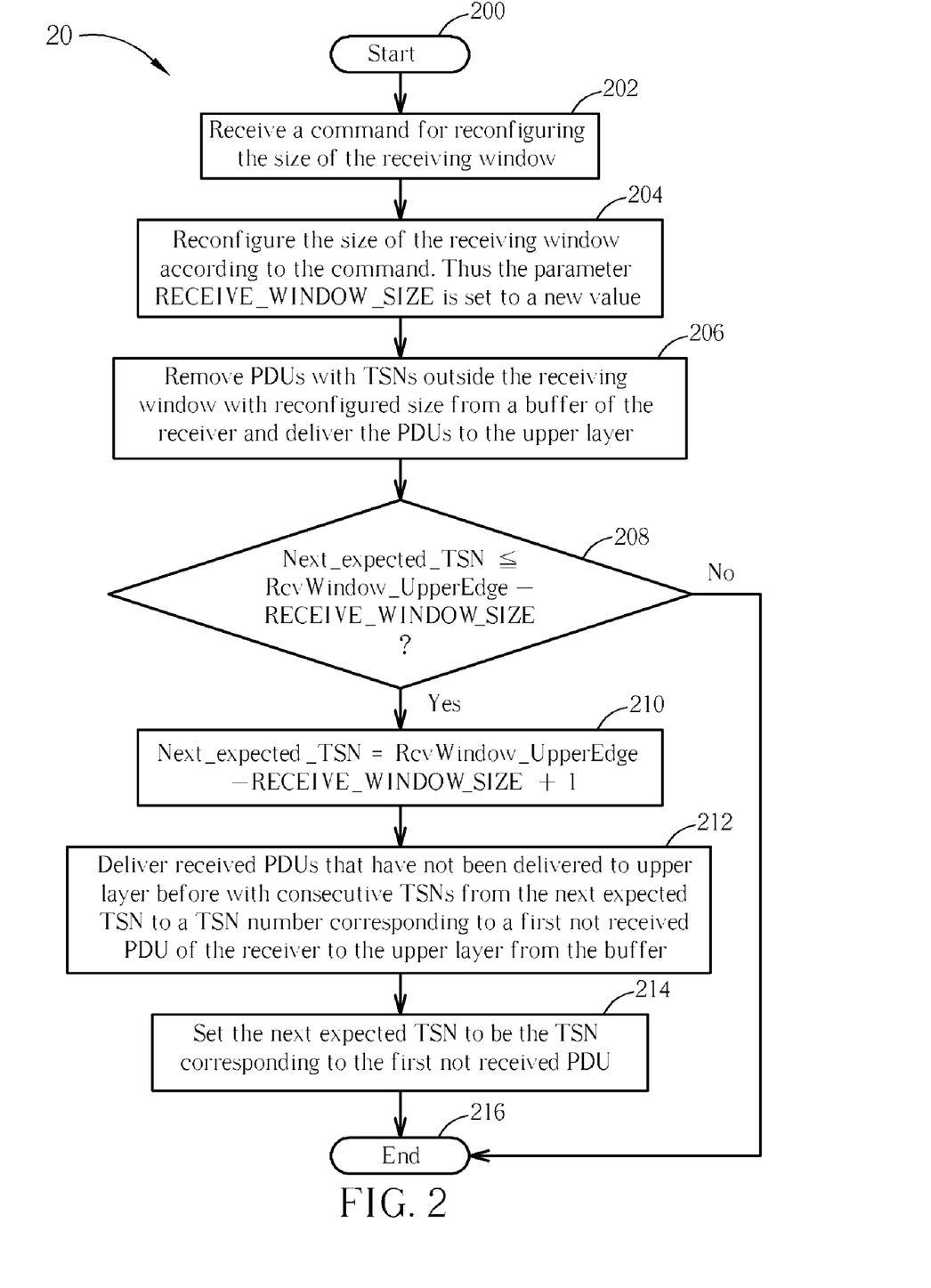
FIG. 2 is a flow chart of a second embodiment of the present invention.

Please refer to FIG. 2. FIG. 2 is a flow chart of a procedure 20 of a second practice in the present invention. The procedure 20 is reconfiguring the receiving window size of the receiver in a HSDPA system, where the parameter RECEIVE_WINDOW_SIZE, the parameter next_expected_TSN, and the parameter RcvWindow_UpperEdge are defined as described above. The procedure 20 comprises:

Step 200: start.

Step 202: receive a command for reconfiguring the size of the receiving window.

Step 204: reconfigure the size of the receiving window according to the command.

Thus the parameter RECEIVE_WINDOW_SIZE is set to a new value.

Step 206: remove PDUs with TSNs outside the receiving window with reconfigured size from a buffer of the receiver and deliver the PDUs to the upper layer.

Step 208: determine whether a next expected TSN is less than or equal to a difference between a TSN corresponding to an upper edge of the receiving window with reconfigured size and the reconfigured receiving window size, meaning determining whether (next_expected_TSN≦RcvWindow_UpperEdge−RECEIVE_WINDOW_SIZE) is true; If so, go to step 210; otherwise, go to step 216.

Step 210: set the next expected TSN to be a lower edge of the receiving window with reconfigured size. This means executing the (next_expected_TSN=RcvWindow_UpperEdge−RECEIVE_WINDOW_SIZE+1) operation.

Step 212: deliver received PDUs that have not been delivered to upper layer before with consecutive TSNs from the next expected TSN to a TSN number corresponding to a first not received PDU of the receiver to the upper layer from the buffer.

Step 214: set the next expected TSN to be the TSN corresponding to the first not received PDU.

Step 216: end.

According to the procedure 20, after the present invention receives the command for reconfiguring the receiving window size, the parameter RECEIVE_WINDOW_SIZE is set to a value requested by the command, so that the receiving window size is reconfigured to a size requested by the system. At the same time, deliver PDUs with TSNs outside the receiving window with reconfigured size and remove the PDUs from the buffer. The present invention then determines whether (next_expected_TSN≦RcvWindow_UpperEdge−RECEIVE_WINDOW_SIZE) is true. If so, the present invention sets the parameter next_expected_TSN to be a lower edge of the receiving window with reconfigured size; then delivers received PDUs that have not been delivered to upper layer before with consecutive TSNs from the next expected TSN to a TSN number corresponding to a first not received PDU of the receiver to the upper layer from the buffer. Finally, the next expected TSN is set to be the TSN corresponding to the first not received PDU. In another word, when (next_expected_TSN≦RcvWindow_UpperEdge−RECEIVE_WINDOW_SIZE) is true, the procedure 20 of the present invention delivers received PDUs with consecutive TSNs from the next expected TSN to a TSN number corresponding to a first not received PDU of the receiver to the upper layer among all received PDUs that have not been delivered to the upper layer. Therefore, in the procedure 20, once PDUs have been delivered to the upper layer, retransmission will not occur. This also avoids erroneously retransmitting PDUs that had been transmitted before when the system reconfiguring the receiving window size.

For example, suppose that a receiver window size is 16 (RECEIVE_WINDOW_SIZE=16) and PDUs with TSN=0 to TSN=30 (inclusive) are successfully received and delivered to the upper layer. Therefore, RcvWindow_UpperEdge=30, next_expected_TSN=31, and the receiver window spans from TSN=15 (=30−16+1) to TSN=30. If the system reconfigures the receiving window size to 8 (RECEIVE_WINDOW_SIZE=8), then the receiver window spans from TSN=23 (=30−8+1) to TSN=30. With a lower edge of the receiving window as a modulus base to do a modulus operation, it is determined if (next_expected_TSN≦RcvWindow_UpperEdge−RECEIVE_WINDOW_SIZE) is true. It is known that:

(next_expected_TSN−23) mod 64=(31−23) mod 64=8
and (RcvWindow_UpperEdge−RECEIVE_WINDOW_SIZE−23) mod 64=(30−8−23) mod 64=63. Since 8<63, (next_expected_TSN≦RcvWindow_UpperEdge−RECEIVE_WINDOW_SIZE) is true and the parameter next_expected_TSN is set to be the lower edge of the new receiving window (next_expected_TSN=23). According to the procedure 20 of the present invention, since PDUs with TSN=23 to TSN=30 had been delivered to the upper layer, the PDUs will not be delivered again. The parameter next_expected_TSN is set to be a TSN corresponding to a first PDU not received, meaning next_expected_TSN=31. With this method, problems such as re-delivering PDUs to the upper layer that occurs in the prior art is solved.

In the prior art, if the next expected TSN of the receiver equals the first TSN after the upper edge of the receiving window, erroneously retransmitting PDUs that had been transmitted before occurs when the system reconfigures the receiving window size. This not only wastes system resources and reduces efficiency, but also accumulates the HFN causing the transmitter's and the receiver's ciphering/deciphering parameters to fall out of synchronization. The system is required to reset the transmitter and the receiver to restore synchronization.

In comparison, the present invention is able to avoid a situation of a next expected TSN of the receiver being equal to a first TSN after an upper edge of the receiving window through determining whether the next expected TSN of the receiver is inside the receiving window with reconfigured size; or if the next expected TSN equals the first TSN after the upper edge of the receiving window, delivers received PDUs with consecutive TSNs from the next expected TSN to a TSN number corresponding to a first not received PDU of the receiver to the upper layer among all received PDUs that have not been delivered to the upper layer. Thus, the present invention can improve the downfall of the prior art since the present invention more efficiently uses the system resources, increases transmission efficiency, and maintains good synchronization in the transmitter and the receiver ciphering/deciphering parameters.

Moreover, when applying the present invention, as known by people who are familiar in this field that designers can write (burn-in) the procedures 10 or 20 into a storage device (firmware) of a communication device as a program code. The present invention is applied on, but not limited to, a receiving window of a receiver whose span and size are defined by an upper edge of the receiving window in a communications system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reconfiguring a size of a receiving window of a receiver in a communications system, the method comprising:
    receiving a command for reconfiguring the size of the receiving window by the receiver;
    reconfiguring the size of the receiving window of the receiver according to the command;
    removing packets with sequence numbers outside the receiving window with reconfigured size from a buffer of the receiver and delivering the packets to an upper layer;
    characterized by further comprising:
    determining whether a sequence number of a next expected packet is equal to a sequence number of an upper edge of the receiving window plus one; and
    keeping the sequence number of the next expected packet and the packets in the buffer of the receiver unchanged when the sequence number of the next expected packet is equal to a sequence number of an upper edge of the receiving window plus one.

2. The method of claim 1, wherein the communications system is a high speed downlink packet access system.

3. The method of claim 1, wherein when the sequence number of the next expected packet of the receiver is outside the receiving window and not equal to a sequence number of an upper edge of the receiving window plus one, the sequence number of the next expected packet of the receiver is determined to be below the receiving window with reconfigured size.

4. A wireless device comprising a central processing unit in electrical communications with a memory, the memory comprising program code for implementing the method of claim 1.

* * * * *

UNITED STATES PATENT AND TRADEMARK OFFICE
CERTIFICATE OF CORRECTION

PATENT NO.         : 7,852,844 B2                           Page 1 of 1
APPLICATION NO.    : 11/278545
DATED              : December 14, 2010
INVENTOR(S)        : Sam Shiaw-Shiang Jiang It is certified that error appears in the above-identified patent and that said Letters Patent is hereby corrected as shown below:

On Title Page Item (73):
Please delete "Taipei (TW)" and insert --Tortola, Virgin Islands, British--

Signed and Sealed this
Fifth Day of August, 2014

Michelle K. Lee
*Deputy Director of the United States Patent and Trademark Office*